US011239739B2

(12) United States Patent
Xing et al.

(10) Patent No.: US 11,239,739 B2
(45) Date of Patent: Feb. 1, 2022

(54) POWER FETCHING SYSTEM FOR NO NEUTRAL SWITCH AND CONTROL METHOD THEREOF, NO NEUTRAL SWITCH

(71) Applicant: Consumer Lighting (U.S.), LLC, Norwalk, CT (US)

(72) Inventors: Dong Xing, Shanghai (CN); Weihu Chen, Shanghai (CN); Fanbin Wang, Shanghai (CN); Aijun Wang, Shanghai (CN); JinPeng Hu, Shanghai (CN)

(73) Assignee: Savant Technologies LLC, East Cleveland, OH (US)

( * ) Notice: Subject to any disclaimer, the term of this patent is extended or adjusted under 35 U.S.C. 154(b) by 29 days.

(21) Appl. No.: 16/796,394

(22) Filed: Feb. 20, 2020

(65) Prior Publication Data

US 2021/0037474 A1    Feb. 4, 2021

(30) Foreign Application Priority Data

Jul. 31, 2019   (CN) .......................... 201910703124.9

(51) Int. Cl.
*H02M 1/00* (2006.01)
*H05B 47/19* (2020.01)
*H05B 47/105* (2020.01)
*H04J 3/00* (2006.01)

(52) U.S. Cl.
CPC ................. *H02M 1/00* (2013.01); *H04J 3/00* (2013.01); *H05B 47/105* (2020.01); *H05B 47/19* (2020.01)

(58) Field of Classification Search
CPC ....... H02M 1/00; H05B 37/105; H05B 47/19; H04J 3/00
See application file for complete search history.

(56) References Cited

U.S. PATENT DOCUMENTS

2020/0264235 A1\*   8/2020   Zhang .................. H05B 39/088

\* cited by examiner

*Primary Examiner* — Dinh T Le
(74) *Attorney, Agent, or Firm* — Wood IP LLC (57) ABSTRACT

The present invention relates to a power fetching system for a no neutral switch and a control method thereof, and a no neutral switch, wherein the power fetching system is connected to an electrical device and a wireless controller, and the wireless controller controls a switch module for changing an operating state of the electrical device. The power fetching system includes: a power fetching module, connected between a power source and the wireless controller, the power source supplying power to the wireless controller and the electrical device, where the power fetching module is configured to obtain power from the power source and supply the obtained power to the wireless controller during energization of the electrical device; and a control module, connected to the power fetching module, and configured to detect power consumption of the wireless controller and provide a control signal to the power fetching module according to a change in power consumption of the wireless controller to adjust the power obtained by the power fetching module from the power source.

19 Claims, 4 Drawing Sheets

POWER FETCHING SYSTEM FOR NO NEUTRAL SWITCH AND CONTROL METHOD THEREOF, NO NEUTRAL SWITCH

TECHNICAL FIELD

The present invention relates to a power fetching system for a no neutral switch and a control method Thereof, and a no neutral switch.

BACKGROUND

With the development of technology and improvement of the living standard, consumers have put forward new requirements for the use of home. For example, for an electric appliance with lighting function, consumers not only require easy control of the lighting time and brightness of the lighting device, but also require the lighting device to cooperate with other systems of the home to meet the requirements of consumers for lighting scenes in different life situations. Consumers need a smart switch control system to enhance the quality of life and want to ensure the convenience and comfort of life.

In this regard, the traditional switch has obvious defects. It does not have a remote-control function, and it cannot meet the lighting needs of consumers for different scenes. In contrast, electronic switches have broad application prospects. On the one hand, since the installation and replacement of electronic switches are convenient and simple, electronic switches can be used to directly replace traditional wall switches that are very popular in traditional home. On the other hand, the electronic switches can also be used to conveniently implement remote control or smart control. For example, the ZigBee smart switch in the smart home has functions such as wireless remote control and touch sensing. However, since when the electronic switch is closed, the voltage across the electronic switch is insufficient to supply power to its own electronic devices. Therefore, an off-state power supply module is provided in the electronic switch for fetching power for the electronic switch when the load (for example, a lighting device) controlled by the electronic switch is turned off. In addition, since the load controlled by the electronic switch has an uncertainty, for example, the electronic switch can be used to control a non-dimmable LED, a dimmable LED, a smart lamp, an incandescent lamp, etc., it becomes difficult to solve the power supply problem of the electronic switch.

SUMMARY

The present invention provides a power fetching system for a no neutral switch. The power fetching system is connected to an electrical device and a wireless controller, and the wireless controller controls a switch module for changing an operating state of the electrical device. The power fetching system includes: a power fetching module, connected between a power source and the wireless controller, the power source supplying power to the wireless controller and the electrical device, where the power fetching module is configured to obtain power from the power source and supply the obtained power to the wireless controller during energization of the electrical device; and a control module, connected to the power fetching module, and configured to detect power consumption of the wireless controller and provide a control signal to the power fetching module according to a change in power consumption of the wireless controller to adjust the power obtained by the power fetching module from the power source. The power fetching system according to the present invention can dynamically adjust the power obtained from the power source according to the power consumption condition of the wireless controller as the load, and thus, for example, can obtain more and sufficient power in the two-wire electrical control system to meet the needs for use of both high-power-consumption wireless controllers (such as WIFI or WIFI/BLE dual-mode) and low-power-consumption wireless controllers.

According to an embodiment of the power fetching system of the present invention, the control module detecting the power consumption of the wireless controller includes detecting a voltage characterizing the power consumption of the wireless controller, and gradually adjusting a duty cycle of the control signal according to the change in the detected voltage. Thus, a simple way to detect the power consumption of the wireless controller is provided to dynamically determine the power consumption condition of the current wireless controller, thereby preparing for the power fetching system to determine whether to draw more or less power.

According to an embodiment of the power fetching system of the present invention, the control module is configured to: adjust the duty cycle of the control signal to a first predetermined duty cycle when the detected voltage is greater than a first threshold; reduce the duty cycle of the control signal from the first predetermined duty cycle to a second predetermined duty cycle when the detected voltage is less than a second threshold, where the second threshold is less than the first threshold; and reduce the duty cycle of the control signal from the second predetermined duty cycle to a third predetermined duty cycle when the detected voltage is less than a third threshold, where the third threshold is less than the second threshold. By adopting the open-loop control logic to determine the power consumption condition of the wireless controller, the power will not be drawn immediately or suddenly due to the high power consumption of the load, thereby avoiding affecting the normal use of electrical devices (for example, lighting devices) due to too fast or too intense power fetching, and making the power fetching system suitable for many different types of electrical devices.

According to an embodiment of the power fetching system of the present invention, the control module is configured to gradually reduce the duty cycle of the control signal by a predetermined amount. The control module can achieve a smooth change in the duty cycle by setting a small predetermined amount of change, so that the power fetching system does not cause a drastic change in voltage due to the change in the power consumption of the wireless controller.

According to an embodiment of the power fetching system of the present invention, the power fetching module includes: a power fetching load, connected in series with the electrical device. The power fetching load can be used to provide a stable impedance to the electrical load, so that the power fetching module can obtain stable and sufficient power. The power fetching load may be implemented as a single component or as a circuit including multiple components. The power fetching load provided according to the present invention can be continuously turned on to draw power when the electrical device is in operation.

According to an embodiment of the power fetching system of the present invention, the power fetching module further includes: a plurality of switching units, connected in parallel with the power fetching load, where the plurality of switching units are turned on or off according to the control signal. By adjusting the closing time of the plurality of switching units, the power drawn by the power fetching module can be effectively adjusted, thereby adjusting the power supplied to the load of the wireless controller.

According to an embodiment of the power fetching system of the present invention, the power fetching module further includes: a rectifier circuit, configured to cooperate with the plurality of switching units to obtain power during a positive half cycle and a negative half cycle of the power source. The power fetching module can maximize the user of the power supplied by the alternating current and improve the power fetching efficiency.

According to an embodiment of the power fetching system of the present invention, the plurality of switching units include two MOS transistors connected in reverse series. The control signal, such as a pulse width modulation signal, provided to the two MOS transistors connected in series, is adjusted depending on the power consumption of the wireless controller.

According to an embodiment of the power fetching system of the present invention, the electrical device is a lighting device. Thus, the power fetching system of the present invention can avoid flickering of the lighting device during operation due to too fast or too intense power fetching.

According to another aspect of the present invention, the present invention further provides a no neutral switch, including: the power fetching system as described above; a power converter, configured to convert a voltage output by the power fetching system into a supply voltage; and a wireless controller, configured to obtain power from the supply voltage to control an operating state of the electrical device.

According to another aspect of the present invention, the present invention further provides a method of controlling the power fetching system for the no neutral switch. The power fetching system is connected to an electrical device and a wireless controller, the wireless controller controls a switch module for changing an operating state of the electrical device, and the power fetching system includes a power fetching module and a control module. The method includes: obtaining power from the power source by the power fetching module and supplying the obtained power to the wireless controller during energization of the electrical device; and detecting power consumption of the wireless controller by the control module and providing a control signal to the power fetching module according to a change in power consumption of the wireless controller to adjust the power obtained by the power fetching module from the power source. According to the present invention, the power obtained from the power source can be dynamically adjusted, thereby meeting the needs for use of both high-power-consumption wireless controllers and low-power-consumption wireless controllers.

According to the method of controlling the power fetching system for the no neutral switch according to the present invention, the detecting the power consumption of the wireless controller by the control module includes: detecting a voltage characterizing the power consumption of the wireless controller by the control module, and gradually adjusting a duty cycle of the control signal according to the change in the detected voltage. Thus, the power consumption condition of the current wireless controller can be dynamically determined, thereby preparing for the power fetching system to determine whether to draw more or less power.

According to the method of controlling the power fetching system for the no neutral switch according to the present invention, the gradually adjusting the duty cycle of the control signal includes: adjusting the duty cycle of the control signal to a first predetermined duty cycle by the control module when the detected voltage is greater than a first threshold; reducing the duty cycle of the control signal from the first predetermined duty cycle to a second predetermined duty cycle by the control module when the detected voltage is less than a second threshold, where the second threshold is less than the first threshold; and reducing the duty cycle of the control signal from the second predetermined duty cycle to a third predetermined duty cycle by the control module when the detected voltage is less than a third threshold, where the third threshold is less than the second threshold. Thus, the power will not be drawn immediately or suddenly due to the high-power consumption of the load, thereby avoiding affecting the use of electrical devices due to too fast or too intense power fetching, for example, causing flickering of the lighting device.

According to the method of controlling the power fetching system for the no neutral switch according to the present invention, the gradually adjusting the duty cycle of the control signal includes gradually reducing the duty cycle of the control signal by a predetermined amount. A smooth change in the duty cycle can be achieved by setting a small predetermined amount of change.

According to another aspect of the present invention, the present invention further provides a storage medium. The storage medium includes a stored program. A device in which the storage medium is located is controlled to perform the method as described above while the program is running.

According to another aspect of the present invention, the present invention further provides a processor. The processor is configured to run a program. The method as described above is performed while the program is running.

According to another aspect of the present invention, the present invention further provides a computer program product. The computer program product is tangibly stored on a computer readable medium and includes computer executable instructions, and the computer executable instructions, when executed, cause at least one processor to perform the method as described above.

BRIEF DESCRIPTION OF THE DRAWINGS

The drawings constitute a part of this specification for the purpose of further understanding of the present invention. The drawings illustrate embodiments of the present invention and are intended to illustrate the principles of the present invention together with the specification. The same components in the drawings are denoted by the same legends. The following figures are shown.

DETAILED DESCRIPTION

In order to enable those skilled in the art better understand the solutions of the present invention, the technical solutions in the embodiments of the present invention will be clearly and completely described below in conjunction with the drawings in the embodiments of the present invention. It is apparent that the described embodiments are merely a part of the embodiments of the present invention, and not all of the embodiments. All other solutions obtained by those of ordinary skill in the art based on the embodiments of the present invention without creative work shall fall within the protection scope of the present invention.

It should be noted that the terms "first", "second" and the like in the specification and claims of the present invention are used to distinguish similar objects and are not necessarily used to describe a particular order or sequence. It should be understood that the data used as such may be interchanged where appropriate, so that the embodiments of the present invention described herein can be implemented in a sequence other than those illustrated or described herein. In addition, the terms "including" and "having" and any variants thereof are intended to cover a non-exclusive inclusion. For example, a process, method, system, product, or device that includes a series of steps or units is not necessarily limited to those steps or units that are clearly listed, but may include other steps or units that are not listed or inherent to those processes, methods, products or devices.

Figure 1:
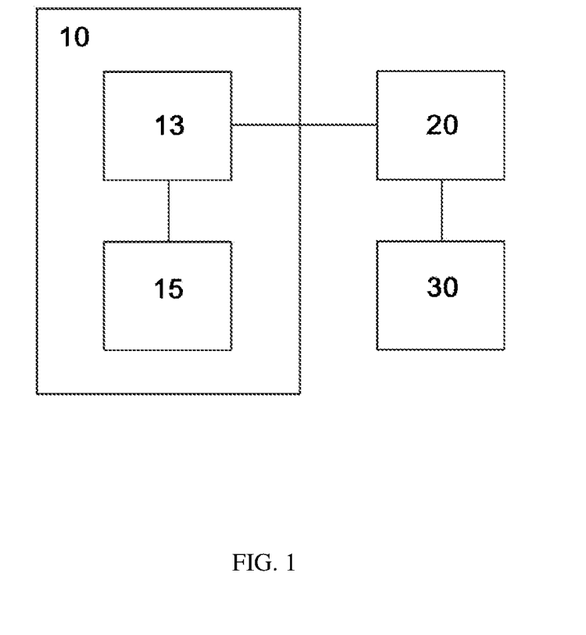
FIG. 1 shows a functional block diagram of a power fetching system for a no neutral switch according to an embodiment of the present invention.

FIG. 1 shows a functional block diagram of a power fetching system 10 for a no neutral switch according to an embodiment of the present invention. The power fetching system 10 according to this embodiment is connected to a wireless controller 20 and an electrical device 30. The wireless controller 20 is used to control a switch module for changing an operating state of the electrical device 30. The power fetching system 10 is connected in series with the switch module and the electrical device 30. The wireless controller 20 controls the switch module to control the current/voltage of the load and realize functions such as turn-on, turn-off, and dimming. For example, the switch module is a relay, a TRIAC, an MOS transistor, or the like. For example, the wireless controller 20 is implemented as a microprocessor or a module having a radio frequency function (for example, a WIFI radio frequency communication module, a BLE radio frequency communication module, a Zigbee radio frequency communication module, etc.). For example, the electrical device is an LED lamp, a traditional incandescent lamp, a halogen lamp, a motor device, a household appliance, or the like. For example, in this embodiment, the electrical device is implemented as a lighting device. Preferably, the power fetching system 10 according to the embodiment of the present invention includes a power fetching module 13 and a control module 15. The power fetching module 13 is connected between a power source and the wireless controller 20. The power source supplies power to the wireless controller 20 and the electrical device 30. The power fetching module 13 is configured to obtain power during a full cycle including a positive half cycle and a negative half cycle of the alternating current power source during energization of the electrical device 30 and supply the obtained power to the wireless controller 20. The control module 15 is connected to the power fetching module 13. The control module 15 is configured to detect power consumption of the wireless controller 20 and provide a control signal to the power fetching module 13 according to a change in power consumption of the wireless controller 20 to adjust the power obtained by the power fetching module 13 from the power source. The control module 15 is further configured to detect the power consumption of the wireless controller 20 by detecting a voltage characterizing the power consumption of the wireless controller 20, and to gradually adjust a duty cycle of the control signal sent to the power fetching module 13 according to the change in the detected voltage.

In the implementation of the present invention, the control module 15 determines the power consumption condition of the wireless controller 20 by adopting the open-loop control logic, and controls the power obtained by the power fetching module 13 from the power source according to the determined power consumption condition. Thus, the control module 15 is configured to: adjust the duty cycle of the control signal to a first predetermined duty cycle when the detected voltage is greater than a first threshold; reduce the duty cycle of the control signal from the first predetermined duty cycle to a second predetermined duty cycle when the detected voltage is less than a second threshold, where the second threshold is less than the first threshold; and reduce the duty cycle of the control signal from the second predetermined duty cycle to a third predetermined duty cycle when the detected voltage is less than a third threshold, where the third threshold is less than the second threshold. Preferably, the difference between the second threshold and the first threshold is equal to the difference between the third threshold and the second threshold. Moreover, in order to adjust the power obtained by the power fetching module 13 in a smooth and as continuous manner as possible, the control module 15 is configured to gradually adjust the duty cycle of the control signal by a predetermined amount. For example, in order to reduce the power obtained by the power fetching module 13 from the power source, the duty cycle of the control signal can be gradually reduced by an amount of change of 0.5% to reduce the duty cycle from 100% to 90%, or from 90% to 80%.

Figure 2:
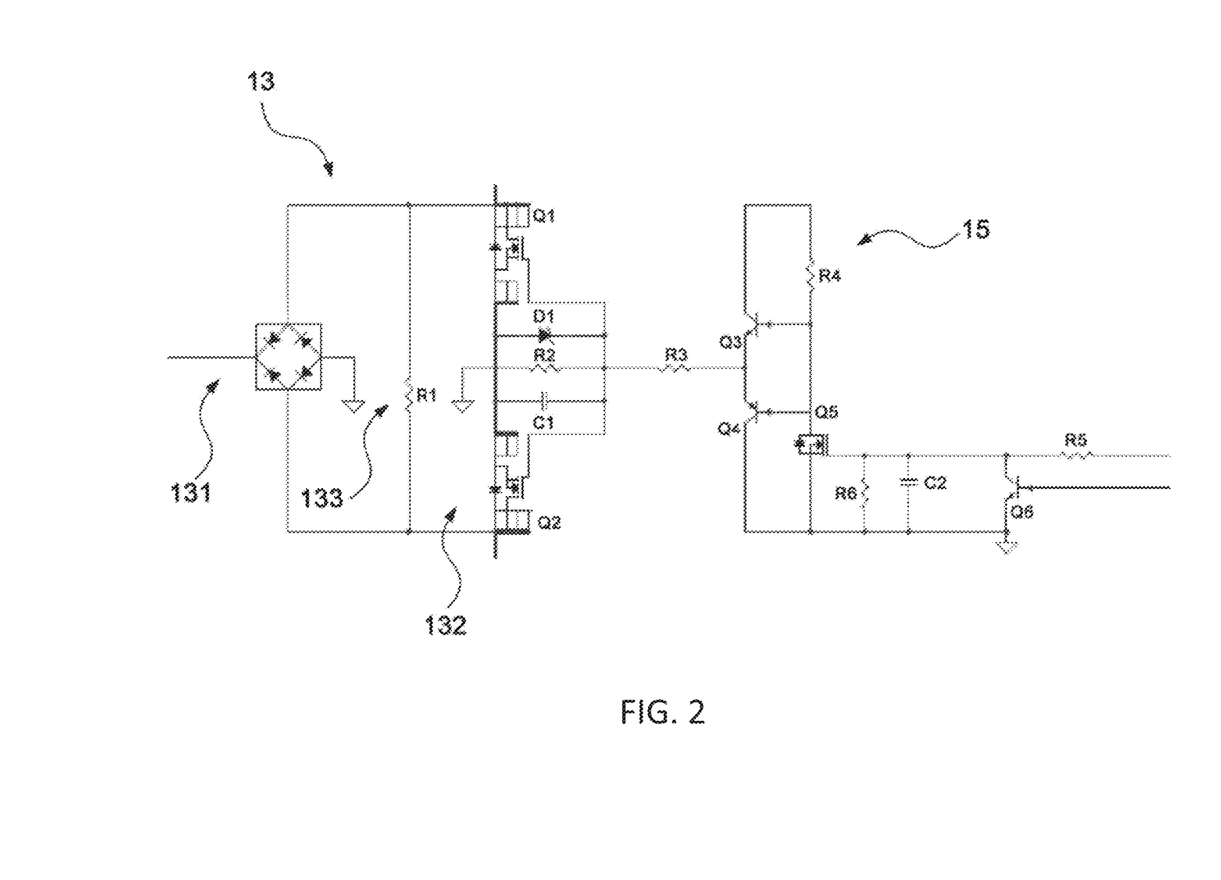
FIG. 2 shows a circuit diagram of the power fetching system according to an embodiment of the present invention.

FIG. 2 shows a circuit diagram of the power fetching system according to an embodiment of the present invention. As shown in FIG. 2, the power fetching system according to the embodiment of the present invention includes a full bridge rectifier circuit 131, a power fetching load 133 and a plurality of switching units 132 constituting the power fetching module 13, and a control circuit constituting the control module 15. The power fetching load 133 may be implemented as a single component or as a circuit including multiple components. In the embodiment of FIG. 2, the power fetching load 133 is implemented as a single component, such as a resistor R1 shown in FIG. 2. In other embodiments, the power fetching load 133 may also be implemented as a circuit including multiple components. The full bridge rectifier circuit 131 is configured to cooperate with the plurality of switching units 132 to obtain power, for example, in both the positive half cycle and the negative half cycle of the alternating current power source, and the full bridge rectifier circuit 131 provides a voltage supplied to the wireless controller via the left output shown in the figure, for example, the voltage is 12V. The power fetching load 133 is implemented as a first resistor R1 having a predetermined impedance that is connected in parallel with the full bridge rectifier circuit 131 and configured to provide an impedance connected in series with the electrical device. The plurality of switching units 132 preferably include two MOS transistors Q1, Q2 connected in reverse series. The source of the first MOS transistor Q1 is connected to the source of the second MOS transistor Q2, and a first diode D1, a second resistor R2 and a first capacitor C1 are connected in parallel with each other between the first MOS transistor Q1 and the second MOS transistor Q2. The power fetching module 13 is connected to the control circuit of the control module 15 via a third resistor R3. The control circuit includes two transistors Q3, Q4 connected in reverse series. The first transistor Q3 is implemented as an NPN type transistor, the second transistor Q4 is implemented as a PNP type transistor, and the emitter of the first transistor Q3 is connected to the emitter of the second transistor Q4. The control circuit further includes a fourth resistor R4 and a third MOS transistor Q5. The fourth resistor R4 is connected to the base of the first transistor Q3, the base of the second transistor Q4 and the drain of the third MOS transistor Q5. The gate of the third MOS transistor Q5 is connected to the gates of the first MOS transistor Q1 and the second MOS transistor Q2 via a fifth resistor R5 for providing a control signal to the two MOS transistors connected in reverse series. Further, a sixth resistor R6, a second capacitor C2 and a third transistor Q6 connected in parallel are disposed between the third MOS transistor Q5 and the fifth resistor R5.

Figure 3:
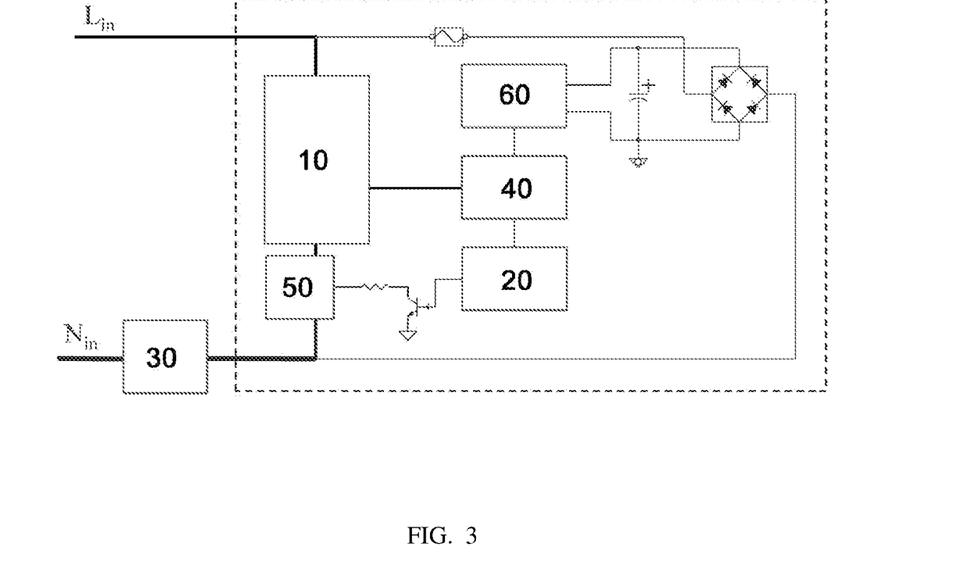
FIG. 3 shows a circuit diagram of a no neutral switch according to an embodiment of the present invention.

FIG. 3 shows a circuit diagram of a no neutral switch according to an embodiment of the present invention. In the embodiment shown in FIG. 3, a no neutral switch is installed in a wire box disposed in a wall, shown by the dashed box, including the power fetching system 10, a power converter 40 and the wireless controller 20 as described above in FIG. 1 and FIG. 2. The power fetching system 10, the power converter 40 and the wireless controller 20 are connected between the live wire Lin and the neutral wire Nin as shown in FIG. 3. For example, in this embodiment, the power converter 40 is a switching power supply, a linear power supply, or the like. During energization of the electrical device, the power fetching system 10 obtains power from the live wire Lin, and the power converter is configured to convert the voltage output by the power fetching system 10 into a supply voltage supplied to the wireless controller 20, such as reducing a 12V output voltage output by the power fetching system to a 3.3V supply voltage supplied to the wireless controller 20. The wireless controller 20 is configured to obtain power from the supply voltage to control an operating state of the electrical device via a dimmer or a switch, such as turning on or off the lighting device, or adjusting the lighting brightness of the lighting device. The no neutral switch may further include a switch module 50, such as a dimmer or a switch, which may be implemented as a TRIAC, an MOS transistor, or a relay. Further, for example, the wireless controller 20 is further configured to receive a wireless control signal from a user or a mobile terminal to control the operating state of the electrical device according to the requirements of the user or the mobile terminal. In this embodiment, in the case where the power fetching system 10 is capable of obtaining more power according to the power consumption condition of the wireless controller 20, the dimmer of the no neutral switch may be designed to have more functions, such as providing cloud service, voice control, edge computing or various sensor functions. In addition, the no neutral switch shown in the embodiment of FIG. 3 may further include an AC/DC 60 converter, and is used for fetching power during the off period of the electrical device and converting the alternating current voltage of the live wire into a voltage that can be supplied to the power converter, thereby supplying power to the wireless controller 20.

Figure 4:
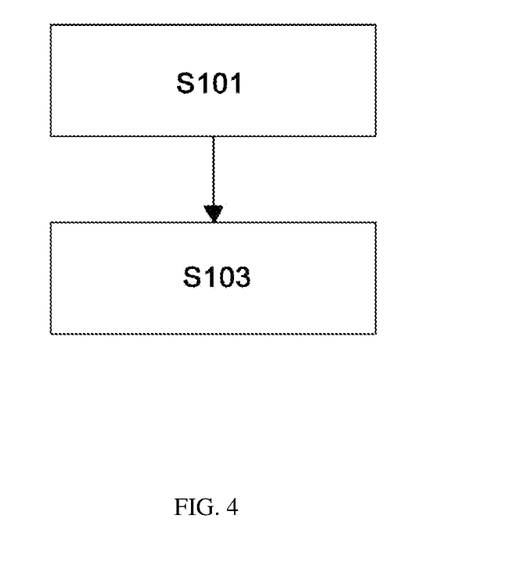
FIG. 4 shows a flow diagram of a method of controlling the power fetching system for the no neutral switch according to an embodiment of the present invention.

FIG. 4 shows a flow diagram of a method of controlling the power fetching system for the no neutral switch according to an embodiment of the present invention. The control method according to the embodiment of the present invention includes: step S101, obtaining power from the power source by the power fetching module and supplying the obtained power to the wireless controller during energization of the electrical device; and step S103, detecting power consumption of the wireless controller by the control module and providing a control signal to the power fetching module according to a change in power consumption of the wireless controller to adjust the power obtained by the power fetching module from the power source. Preferably, in step S103, the detecting the power consumption of the wireless controller by the control module includes detecting a voltage characterizing the power consumption of the wireless controller by the control module, and gradually adjusting a duty cycle of the control signal according to the change in the detected voltage. Moreover, in step S103, the gradually adjusting the duty cycle of the control signal includes gradually reducing the duty cycle of the control signal by a predetermined amount, for example, gradually reducing the duty cycle of the control signal by an amount of change of 0.5% to reduce the duty cycle from 100% to 90%, or from 90% to 80%. Further, in step S103, the gradually adjusting the duty cycle of the control signal includes: adjusting the duty cycle of the control signal to a first predetermined duty cycle by the control module when the detected voltage is greater than a first threshold; reducing the duty cycle of the control signal from the first predetermined duty cycle to a second predetermined duty cycle by the control module when the detected voltage is less than a second threshold, where the second threshold is less than the first threshold; and reducing the duty cycle of the control signal from the second predetermined duty cycle to a third predetermined duty cycle by the control module when the detected voltage is less than a third threshold, where the third threshold is less than the second threshold.

Figure 5:
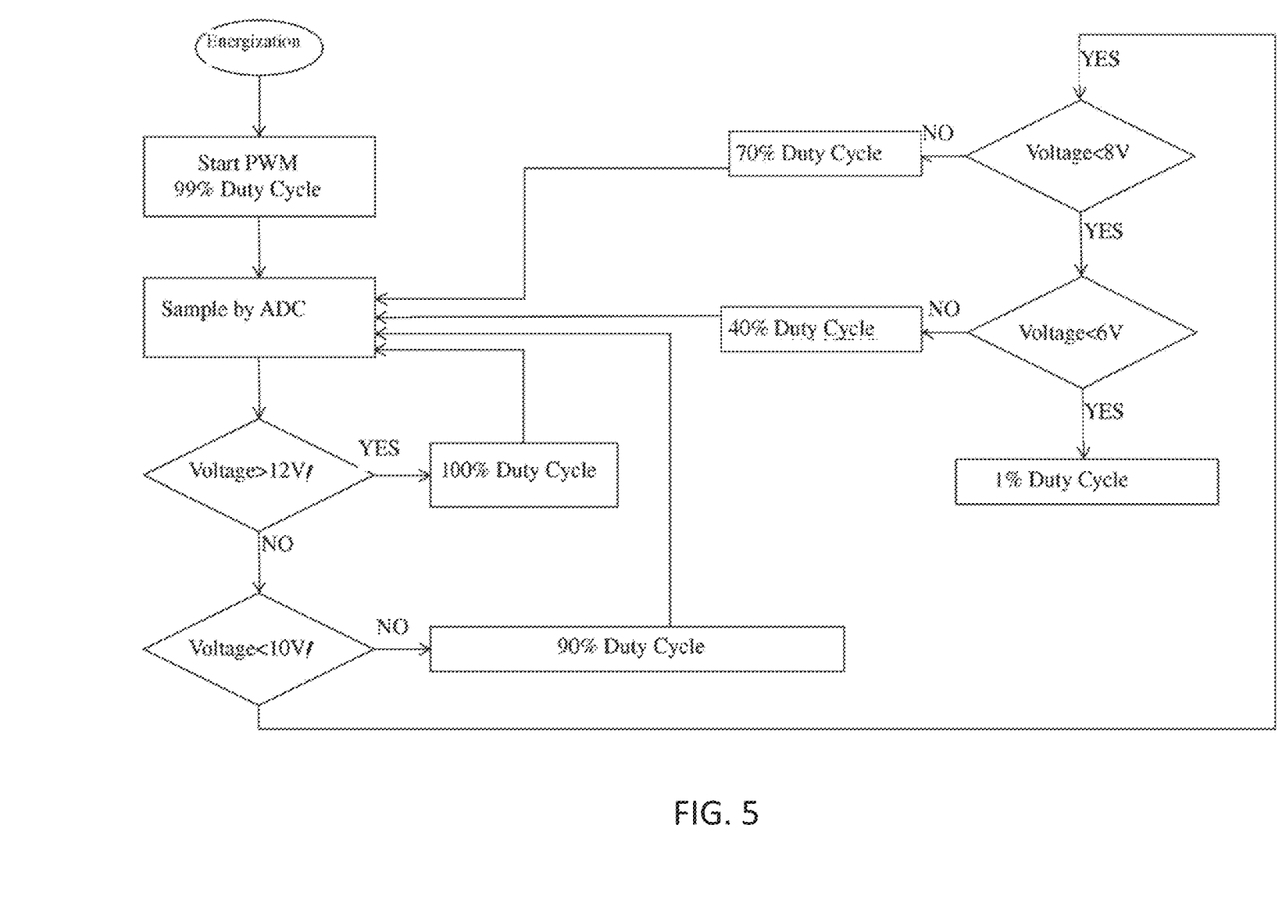
FIG. 5 shows a flow diagram of adjusting the power by the power fetching module from the power source according to an embodiment of the present invention.

FIG. 5 shows a flow diagram of adjusting the power by the power fetching module from the power source according to an embodiment of the present invention. As shown in FIG. 5, during energization of the electrical device, the control module of the power fetching system starts to provide a control signal with a duty cycle of 99% to the power fetching module in a pulse width modulation (PWM) manner with a pulse frequency of 2 KHz, and then the control module uses an analog-to-digital converter (ADC) to detect or sample the voltage characterizing the power consumption of the wireless controller. If the detected voltage is greater than a predetermined threshold voltage of 12V, the duty cycle of the control signal is adjusted to 100%, so that the power fetching system can obtain power as much as possible. If the detected voltage is less than 12V but greater than 10V, the duty cycle of the control signal is reduced to 90%. For example, the duty cycle is smoothly reduced from 100% to 90% by a predetermined amount of 0.5%. If the detected voltage is less than 10V but greater than 8V, the duty cycle of the control signal is reduced to 70%. For example, the duty cycle is smoothly reduced from 90% to 70% by a predetermined amount of 0.5%. If the detected voltage is less than 8V but greater than 6V, the duty cycle of the control signal is reduced to 40%. For example, the duty cycle is smoothly reduced from 70% to 40% by a predetermined amount of 0.5%. If the detected voltage is less than 6V, the duty cycle of the control signal is gradually reduced from 40% to 1% by a predetermined amount of decrease of 0.5% to minimize the power fetched.

The foregoing descriptions are merely preferred embodiments of the present invention and are not intended to limit the present invention. For those skilled in the art, the present invention may have various changes and modifications. Any modification, equivalent replacement, or improvement made within the spirit and principle of the present invention shall fall into the protection scope of the present invention.

What is claimed is:

1. A power fetching system for a no neutral switch, comprising,
a power fetching module; and
a control module, configured to connect to and control the power fetching module,
wherein the power fetching module is connected in series to an electrical device through a wireless controller, and the wireless controller controls a switch module to control the operation of the electrical device,
wherein the power fetching module is further connected between a power source and the wireless controller and configured to obtain power from the power source and supply the obtained power to the wireless controller; and
wherein the control module is configured to detect power consumption of the wireless controller and provide a control signal to the power fetching module according to a change in power consumption of the wireless controller to adjust the power obtained by the power fetching module from the power source.

2. The power fetching system of claim 1, wherein the control module detecting the power consumption of the wireless controller comprises detecting a plurality of voltages corresponding to the power consumptions of the wireless controller, and gradually adjusting a duty cycle of the control signal according to the detected voltages to adjust the power obtained by the power fetching module from the power source.

3. The power fetching system of claim 2, wherein the control module is configured to:
adjust the duty cycle of the control signal to a first predetermined duty cycle when the detected voltage is greater than a first threshold;
reduce the duty cycle of the control signal from the first predetermined duty cycle to a second predetermined duty cycle when the detected voltage is less than a second threshold, wherein the second threshold is less than the first threshold; and
reduce the duty cycle of the control signal from the second predetermined duty cycle to a third predetermined duty cycle when the detected voltage is less than a third threshold, wherein the third threshold is less than the second threshold.

4. The power fetching system of claim 3, wherein the control module is configured to gradually reduce the duty cycle of the control signal by a predetermined amount.

5. The power fetching system of claim 1, wherein the power fetching module comprises: a power fetching load, connected in series with the electrical device.

6. The power fetching system of claim 5, wherein the power fetching module further comprises:
a plurality of switching units, connected in parallel with the power fetching load, wherein the plurality of switching units are turned on or off according to the control signal.

7. The power fetching system of claim 6, wherein the power fetching module further comprises:

a rectifier circuit, configured to cooperate with the plurality of switching units to obtain power during a positive half cycle and a negative half cycle of the power source.

8. The power fetching system of claim 6, wherein the plurality of switching units comprise two MOS transistors connected in reverse series.

9. The power fetching system of claim 1, wherein the electrical device is a lighting device.

10. A no neutral switch, comprising:
the power fetching system of claim 1; and
a power converter, configured to convert a voltage output by the power fetching system into a supply voltage that is supplied to the wireless controller, to control the operation of the electrical device.

11. A method of controlling the power fetching system for the no neutral switch, wherein the power fetching system is connected in series to an electrical device through a wireless controller, the wireless controller controls a switch module to control the operation of the electrical device, and the power fetching system comprises a power fetching module and a control module configured to connect to and control the power fetching module, wherein the power fetching module is further connected between a power source and the wireless controller, the method comprising:
obtaining power from the power source by the power fetching module and supplying the obtained power to the wireless controller; and
detecting power consumption of the wireless controller by the control module and providing a control signal to the power fetching module according to a change in power consumption of the wireless controller to adjust the power obtained by the power fetching module from the power source.

12. The method of claim 11, wherein the detecting the power consumption of the wireless controller by the control module comprises:
detecting a plurality of voltages corresponding to the power consumptions of the wireless controller by the control module, and gradually adjusting a duty cycle of the control signal according to the detected voltages to adjust the power obtained by the power fetching module from the power source.

13. The method of claim 12, wherein the gradually adjusting the duty cycle of the control signal comprises:
adjusting the duty cycle of the control signal to a first predetermined duty cycle by the control module when the detected voltage is greater than a first threshold;
reducing the duty cycle of the control signal from the first predetermined duty cycle to a second predetermined duty cycle by the control module when the detected voltage is less than a second threshold, wherein the second threshold is less than the first threshold; and
reducing the duty cycle of the control signal from the second predetermined duty cycle to a third predetermined duty cycle by the control module when the detected voltage is less than a third threshold, wherein the third threshold is less than the second threshold.

14. The method of claim 12, wherein the gradually adjusting the duty cycle of the control signal comprises:
gradually reducing the duty cycle of the control signal by a predetermined amount.

15. A computer readable storage medium storing a stored computer readable program, wherein a device in which the computer readable storage medium is located is controlled to perform the method according to claim 11 while the computer readable program is running.

16. A processor configured to run a program to perform the method of claim 11.

17. A computer program product, tangibly stored on a computer readable medium and comprising computer executable instructions, wherein the computer executable instructions, when executed, cause at least one processor to perform the method of claim 11.

18. The power fetching system of claim 1, wherein the wireless controller is further configured to receive a wireless control signal from a user or a mobile terminal to control the electrical device.

19. The method of claim 11, wherein the wireless controller is further configured to receive a wireless control signal and the method further comprising using the wireless controller to receive a wireless control signal from a user or a mobile terminal to control the electrical device.

* * * * *